April 17, 1962 — I. VICTOR — 3,029,612
COOLING SYSTEM FOR FLUIDS
Original Filed Aug. 29, 1955

INVENTOR
IRVING VICTOR
BY Whiteley and Caine
ATTORNEYS

April 17, 1962  I. VICTOR  3,029,612
COOLING SYSTEM FOR FLUIDS
Original Filed Aug. 29, 1955  2 Sheets-Sheet 2

INVENTOR
IRVING VICTOR
BY Whiteley and Caine
ATTORNEYS

United States Patent Office 3,029,612
Patented Apr. 17, 1962

3,029,612
COOLING SYSTEM FOR FLUIDS
Irving Victor, Minneapolis, Minn., assignor to Vic Manufacturing Company, Minneapolis, Minn., a corporation of Minnesota
Continuation of abandoned application Ser. No. 531,198, Aug. 29, 1955. This application Apr. 25, 1960, Ser. No. 24,453
3 Claims. (Cl. 62—185)

This invention relates to a cooling system for fluids. In general, it relates to a liquid cooling system wherein a prime fluid is cooled by a liquid, which, in turn, is cooled by a refrigeration system. More particularly, the invention is concerned with maintaining solvents, used for cleansing garments and other materials, at a desired temperature.

The desirability of cooling fluids of all types has long been recognized. For example, one fluid cooling process to which this invention is applicable is the cooling of dry cleaning solvents. In the use of solvents for cleansing garments and similar materials, it has been a problem to maintain the solvent at its optimum temperature to obtain the best cleaning results. It is well known that if this temperature becomes too high, bleeding of colors, shrinkage of materials, and excessive solvent evaporation will result, while if the temperature of the solvent is allowed to become too low, poor soil removal will result. Maintenance of the solution temperature at a predetermined optimum point will produce good and efficient results. The prior practice has been to provide a solvent cooling heat exchanger through which cold water from the usual water supply is circulated. Obviously, such a system wastes a great deal of water and has no control over the temperature of the cooling water flowing through the exchanger.

This application is a continuation of application Ser. No. 531,198, filed August 29, 1955, now abandoned.

It is an object of this invention to provide a recirculating-liquid-type cooling system wherein the flow of a coolant for a heat exchanger is controlled by the heat given up by the fluid being cooled in the heat exchanger.

It is another object to provide a recirculating-liquid-type cooling system applicable for use with dry cleaning equipment to provide a coolant for circulation through a heat exchanger, whereby the cooling capacity thereof will automatically be controlled in accordance with the temperature of the dry cleaning solvent in order to maintain said solvent at its optimum temperature.

Other and further objects may become apparent from the following specification and claims, and in the appended drawings in which:

Having reference to the several figuers of the drawings, the invention will now be described in detail.

Figure 5:
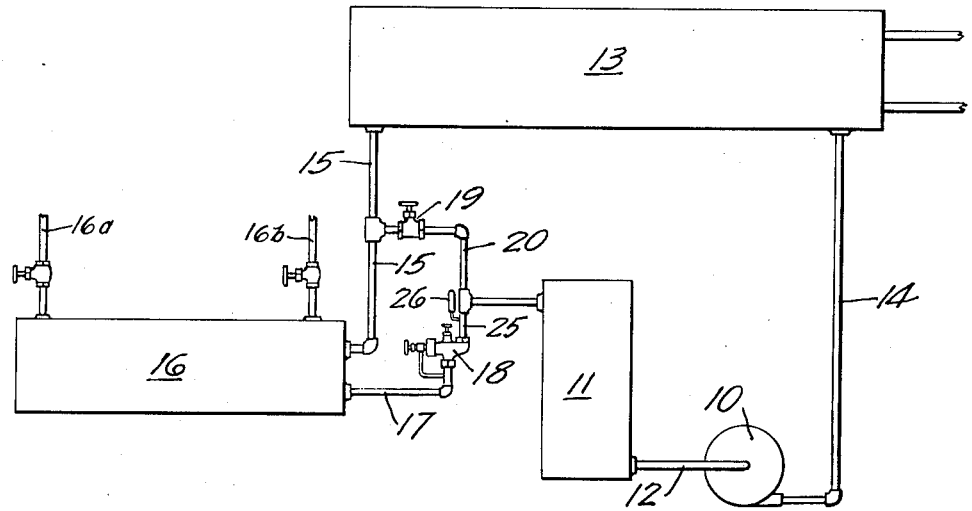
FIG. 5 is a diagrammatic view showing the liquid cooling system as connected with a fluid heat exchanger.

Referring first to FIG. 5, reference numeral 10 indicates a centrifugal pump which is connected with an accumulation and expansion tank 11 by means of a pipe 12. The pump 10 is capable of delivering the water, or other suitable liquid coolant, received from said tank 11 under a substantial pressure to a chiller tank 13 through a pipe 14. A suitable cooling coil is disposed within the tank 13 and will be subsequently described in connection with the description of the refrigeration system. From chiller tank 13, the cold water is delivered through a discharge pipe 15 and outwardly therefrom to a heat exchanger 16 through which dry cleaning solvent, or the like, is flowing under the control of valves 16a and 16b. In order to maintain the temperature of the water flowing from the heat exchanger 16 at a predetermined point, said heat exchanger is connected by heat exchanger discharge pipe 17 to an extremely simple, yet highly efficient thermostatically controlled flow modulating device 18. Said flow modulating device is provided to control the flow of water from heat exchanger 16 back to the accumulation and expansion tank 11. Obviously, when the temperature of the water in the heat exchanger discharge pipe 17 is sufficiently low, and therefore, the valve 18 is at least partially closed, the pressure in the discharge pipe 15 will be increased because of the action of pump 10. A pressure responsive release valve 19 is interposed in a by-pass pipe 20 connected directly between the discharge pipe 15 and the accumulation tank 11, so that when the pressure in line 15 increases to a predetermined limit, the relief valve 19 will open to the extent necessary to relieve said pressure, and a portion of the water will be permitted to flow directly to the tank 11 through pipe 20 without passing through the heat exchanger 16. Thus, the flow through heat exchanger 16 is limited, and continuous circulation of water is maintained through chiller tank 13.

Figure 1:
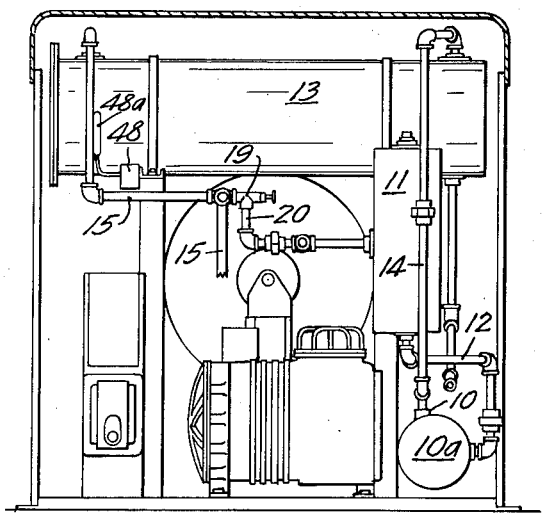
FIG. 1 is a rear elevational view of the improved liquid cooling system.
Figure 2:
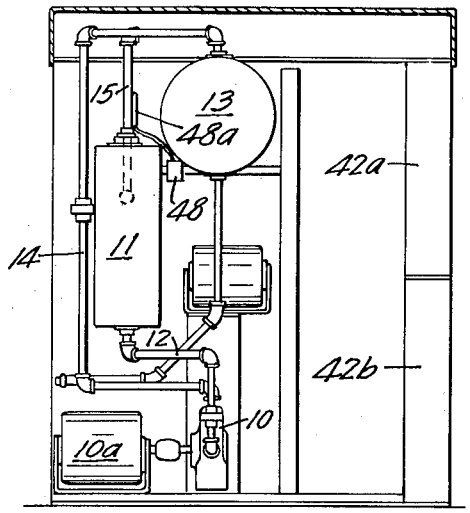
FIG. 2 is a left-side elevational view of said liquid cooling system.
Figure 6:
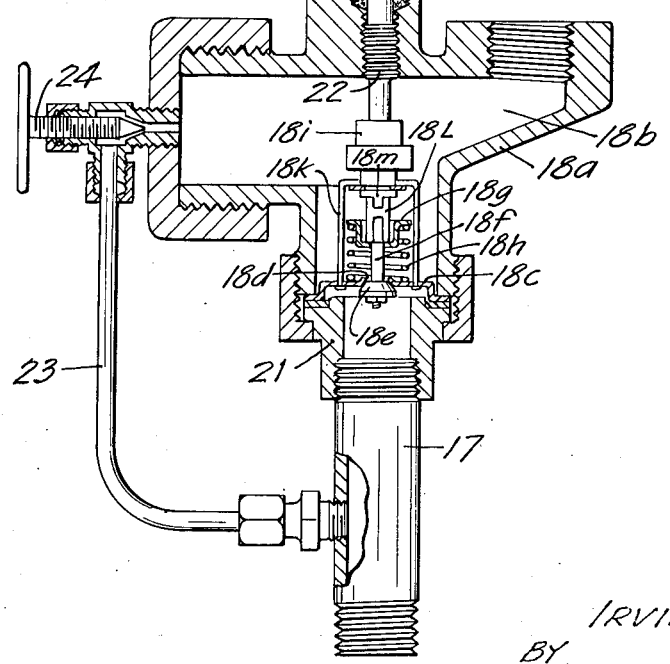
FIG. 6 is a vertical sectional view taken through the flow modulating device.

Details of the flow modulating device 18 are best shown in FIG. 6. Said device has a main body or casing 18a with a chamber 18b defined therewithin. The casing contains an inlet port connected with the heat exchanger discharge pipe 17 by the flanged coupling assembly 21. Within the valve chamber 18b adjacent the inlet port is mounted a valve unit composed of a closure disc 18c against which the flanged coupling 21 sealingly engages. Said disc 18c is imperforate except for a valve seat 18d formed therethrough and said seat is normally closed by a valve element 18e, which is normally seated therein. A valve stem 18f is connected with the valve element 18e in a fixed relation thereto and has a spring pressed collar 18g fixed to the upper portion thereof and is normally held in a closed position by a spring 18h interposed between the collar and the disc 18c. A temperature responsive thermostatic element 18i is carried by a supporting cage 18k that actuates a push rod 18l to project the same downwardly in accordance with increases in the temperature of the liquid being controlled, and in the present form, in accordance with the temperature of the liquid in chamber 18b. The push rod 18l is adjustably spaced above the upper end of valve stem 18f so that a lost motion connection is provided therebetween. The spacing between these two elements is adjustably varied by the adjustment rod 22, which is screw threaded through the upper portion of the casing 18a, and is provided with a handle 22a that may be pre-set with respect to an index 22b on the surface of the casing 18a. When the rod 22 is projected downwardly, the valve will open at a lower temperature, and when the same is projected upwardly to increase the spacing between the push rod 18l and the valve stem 18f, the valve will begin to open at a higher temperature. A resilient member, such as the resilient sleeve element 18m, normally holds the thermostatic element upwardly against the lower end of the adjustment rod 22. In order to permit a continuous restritced flow of the liquid to be controlled to contact the sensing element 18i, a by-pass conduit 23 offers communication directly between the heat exchanger discharge pipe 17 and the valve chamber 18b. A needle valve 24 is provided to adjust the flow through the by-pass conduit 23. Liquid from the chamber 18b is connected by a return conduit 25 to tank 11 and back therefrom to the inlet opening of pump 10 through pipe 12. A thermometer 26 may be mounted in conduit 25 to indicate the temperature in the return flow liquid. The recirculating-liquid cooling system is shown in FIGS. 1 and 2.

Figure 3:
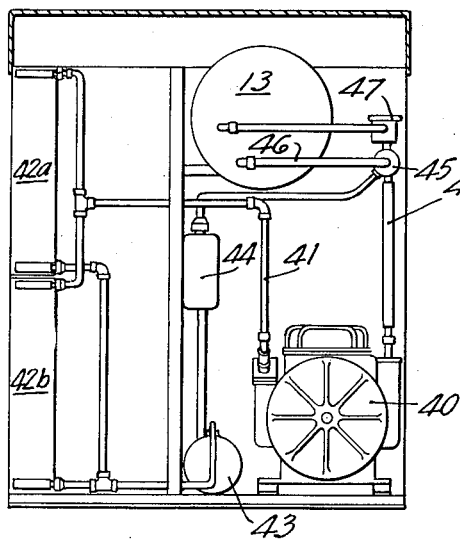
FIG. 3 is a right-side elevational view of the refrigeration system.
Figure 4:
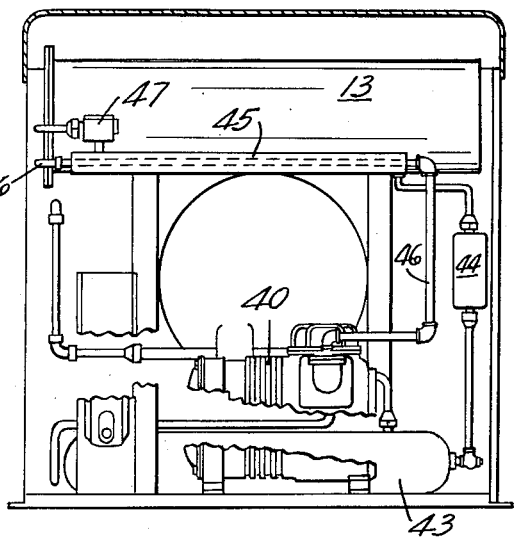
FIG. 4 is a rear elevational view of said refrigeration system.

The refrigeration system for cooling the water in the chiller tank 13 is illustrated in FIGS. 3 and 4. A compressor 40 has its high pressure side joined to a pipe 41 into the condenser assembly, which consists of a pair of condenser units 42a and 42b, which are designed to provide a minimum of flow restriction of the fluid therethrough during the cooling of the refrigerant. Doubling the size of the condenser capacity over that conventionally used with a particular size compressor materially increases the efficiency of the cooling apparatus. The condensed refrigerant passes through the condensers and into a receiver 43, and upwardly therefrom to a filter dryer unit 44 of conventional design, and thereafter the pipe from said unit 44 delivers the dry refrigerant into a counter-flow heat interchanger chamber defined by tubular jacket 45 concentrically surrounding a portion of the suction line 46 from the coil within the chiller tank 13. A thermostatic expansion valve 47 controls the flow of refrigerant from the heat interchanger 45 and into an evaporator coil disposed within the chiller shell of tank 13. Obviously, the cold gas coming from the evaporator coil within the tank 13 through suction line 46 serves to cool the condensed liquid passing through the heat interchanger 45 to permit highly efficient cooling through the coil within the tank 13. Also, the suction gas coming from the coil through suction line 46 is warmed sufficiently to positively insure evaporation of any liquid therein to permit efficient compression thereof by the compressor 40. A limit switch type of shut-off 48, having a sensing bulb 48a (best seen in FIGS. 1 and 2) disposed adjacent the water discharge line 15 from the chiller tank, is provided to prevent said water from becoming too cold when insufficient heat is being supplied thereto by the heat exchanger 16. Limit switch 48 is connected with the compressor motor and condenser fan motor (not shown) in conventional way, and merely shuts off the motor. The motor 10a of pump 10, however, is not shut off by limit switch 48, but is constantly and continuously driven to circulate liquid through the chiller tank 13 and heat exchanger 16 in accordance with the demands of the flow modulating device 18.

The general operation of the process and apparatus is as follows: As seen in FIG. 5, the fluid to be cooled, as for example, a dry cleaning solvent which is to be maintained at a predetermined optimum temperature, is circulated from a cleaning machine, not shown, through heat exchanger 16 under the control of valves 16a and 16b. The coolant, water or other suitable liquid, is circulated by pump 10 from tank 11 through pipe 12 and thence to chiller tank 13 by way of pipe 14. The coolant then circulates through discharge pipe 15 into the heat exchanger 16 and out of heat exchanger discharge pipe 17 to the flow modulating device 18. The conduit 23, seen in FIG. 6, equipped with a manually operable needle valve 24 extends from pipe 17 directly to valve chamber 18b to form an adjustable by-pass around the elements 18d and 18e to allow a controlled flow of liquid into contact with the thermostatic element 18i.

When a demand for the cooling capacity of the heat exchanger 16 exists, and therefore, the temperature of the coolant flowing into heat exchanger discharge pipe 17 is above a predetermined point, thermostatic element 18i will react in response to the temperature of the limited amount of coolant passing into chamber 18b by way of conduit 23. Valve element 18e is pushed downward allowing flow through 18d into the valve chamber 18b, and thence through pipe 25 back to the accumulation and expansion tank 11.

When there is no demand for the cooling capacity of the heat exchanger, and therefore, the temperature of the coolant flowing through the flow modulating device 18 becomes lower than the predetermined point, thermostatic element 18i will react in response to the temperature of the coolant flowing through the modulating valve. Valve element 18e moves upward and positions itself within valve seat 18d to terminate the flow through the valve. As flow through the modulating valve 18 is terminated, or substantially reduced, pressure builds up in the chiller discharge pipe 15 due to the action of pump 10. The pressure responsive relief valve 19 will open at a predetermined pressure and allow coolant to by-pass the heat exchanger 16 and flow through pipe 20 back to the accumulation and expansion tank 11.

The flow modulating device 18, working in conjunction with pressure release valve 19, permits very accurate control of the temperature of the discharge coolant from the heat exchanger 16. This temperature may be predetermined by simply pre-setting the manually adjustable handle 22a with the index 22b. The adjustment of the sensing by-pass 23 is important in maintaining the temperature and pressure control, since only sufficient coolant should be permitted to flow around control valve 18e to permit accurate sensing thereof by the thermostatic sensing element 18i. Excessive flow through by-pass 23 will produce excessive circulation through heat exchanger 16 even when the modulating valve itself is closed, thus providing too much cooling in the heat exchanger and preventing the optimum temperature for the cleaning solution from being maintained. Needle valve 24 may be moved to a fully open position to allow by-pass conduit 23 and said valve to be easily flushed free of any foreign material, such as pipe scale or the like. Flow through the flow modulating device may be terminated by moving needle valve 24 to its closed position and adjusting the handle 22a so that valve element 18e moves to a closed position with respect to valve seat 18d.

As has been brought out previously herein, this invention provides a cooling system which requires the use of only the initial supply of coolant liquid thereto, and does not constantly use a supply of coolant, such as water from a city water supply or the like, and thereafter merely discharge this cooling water down the drain. By providing a recirculating-liquid-type coolant system wherein the coolant liquid is constantly maintained at an accurately controlled temperature, there is no waste of the coolant liquid and a great deal better control of the coolant temperature can be obtained by the refrigeration system. In addition, by maintaining continuous circulation of the coolant liquid through the chiller tank 13, a constant temperature for the entire volume of coolant is thus obtained, thus building up a reservoir of cooling capacity within the system which would not be possible without the continuous circulation arrangement.

As changes and modifications may be apparent to those skilled in the art, this invention is defined in terms of the appended claims.

I claim:

1. A heat exchange system, comprising a liquid circuit, a first heat exchanger in said circuit adapted to reduce the temperature of a coolant liquid in said circuit, a second heat exchanger in said circuit on the discharge side of said first heat exchanger adapted to reduce the temperature of a medium to be refrigerated, a modulating valve responsive to the temperature of liquid passing therethrough disposed in said circuit between the discharge side of said second heat exchanger and the intake side of said first heat exchanger for controlling the flow of coolant liquid in said second heat exchanger, a pressure relief valve operatively disposed in said circuit between the discharge and intake side of said first heat exchanger forming a by-pass about said second heat exchanger and said modulating valve, a pump disposed in said circuit capable of circulating the coolant liquid under sufficient pressure to maintain a substantial circulation of the coolant liquid within said circuit through said pressure relase valve when flow through said modulating valve is restricted.

2. A heat exchange system, comprising a liquid circuit, a liquid chiller disposed in said circuit, a pump capable of delivering substantial pressure disposed within said circuit with its high pressure side connected to said chiller, a heat exchanger disposed within said circuit on the discharge side of said chiller, an expansion tank disposed in said circuit between the discharge side of said heat exchanger and the low pressure side of said pump, a modulating valve responsive to the temperature of liquid passing therethrough disposed in said circuit between said heat exchanger and said expansion tank, and adapted to control the rate of flow of liquid through said heat exchanger, and a pressure responsive by-pass valve disposed in said circuit between the discharge of said chiller and said expansion tank.

3. A heat exchange system, comprising a liquid circuit, a first heat exchanger in said circuit adapted to change the temperature of the liquid in said circuit, a second heat exchanger in said circuit on the discharge side of said first heat exchanger adapted to change the temperature of a medium to accord with the temperature of the liquid in said circuit, a pump capable of imparting a substantial pressure to the liquid in said circuit, a pressure release valve in said circuit between the discharge and intake sides of said first heat exchanger forming a by-pass about said second heat exchanger, a modulating device in said circuit on the discharge side of said second heat exchanger embodying a casing containing a valve adapted to terminate flow through said second heat exchanger, a thermal element in said casing on the discharge side of said valve operatively controlling said valve, and a manually operable by-pass associated with said casing for by-passing liquid in said circuit about said valve and into contact with said thermal element.

References Cited in the file of this patent

UNITED STATES PATENTS

| | | |
|---|---|---|
| 1,850,963 | Sponar | Mar. 22, 1932 |
| 1,877,510 | Hughes | Sept. 10, 1932 |
| 2,325,228 | Cornelius | July 27, 1943 |
| 2,336,066 | Cain | Dec. 7, 1943 |